Oct. 5, 1965                      W. B. ELMER                     3,210,536
                    LUMINAIRE AND MEANS FOR LIGHTING STREETS
Original Filed March 5, 1957                                 6 Sheets-Sheet 1

INVENTOR.
WILLIAM B. ELMER
BY
*Porter, Chittick + Russell*

ATTORNEYS

Oct. 5, 1965 W. B. ELMER 3,210,536
LUMINAIRE AND MEANS FOR LIGHTING STREETS
Original Filed March 5, 1957 6 Sheets-Sheet 2
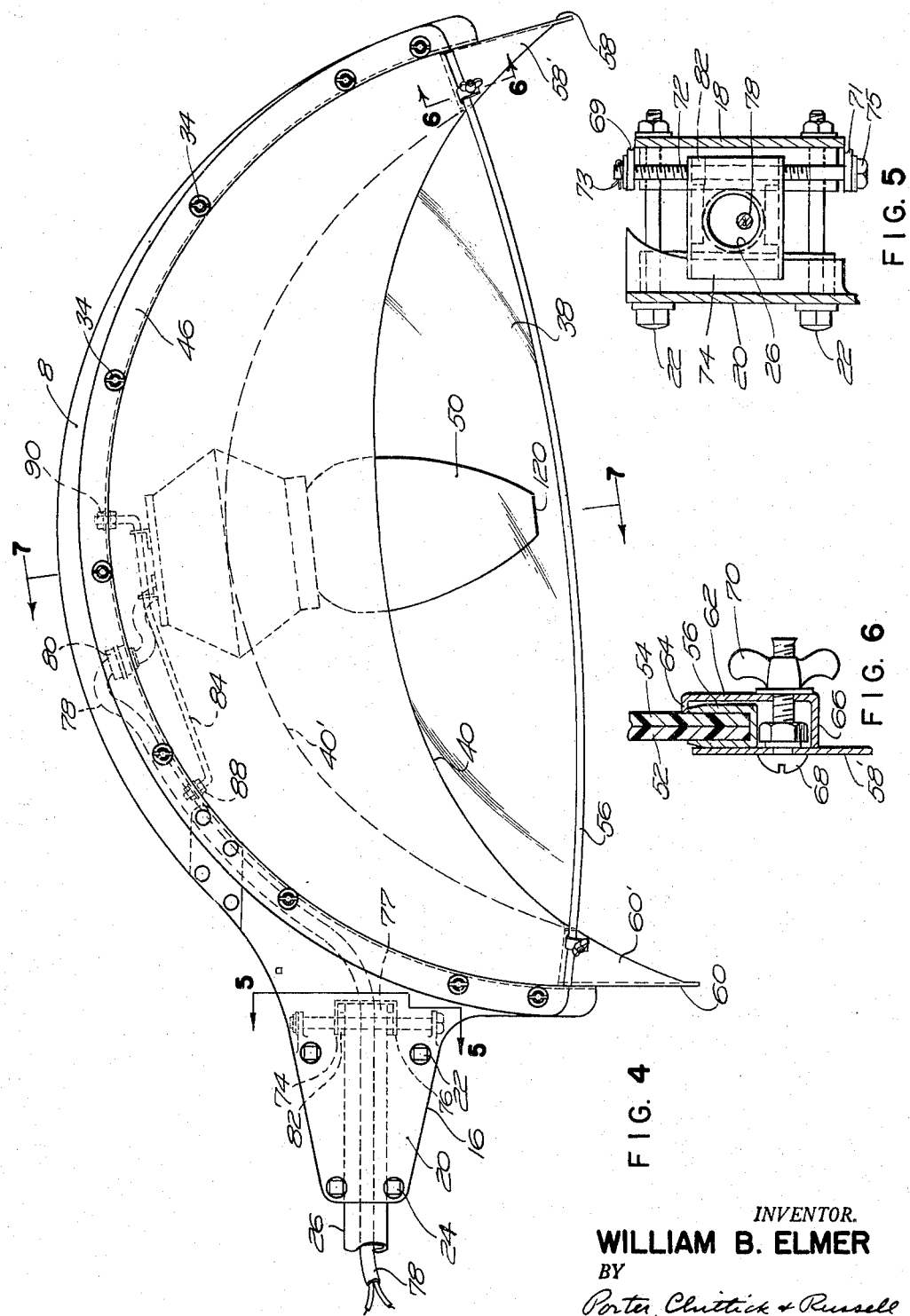
INVENTOR.
WILLIAM B. ELMER
BY
*Porter, Chittick & Russell*
ATTORNEYS

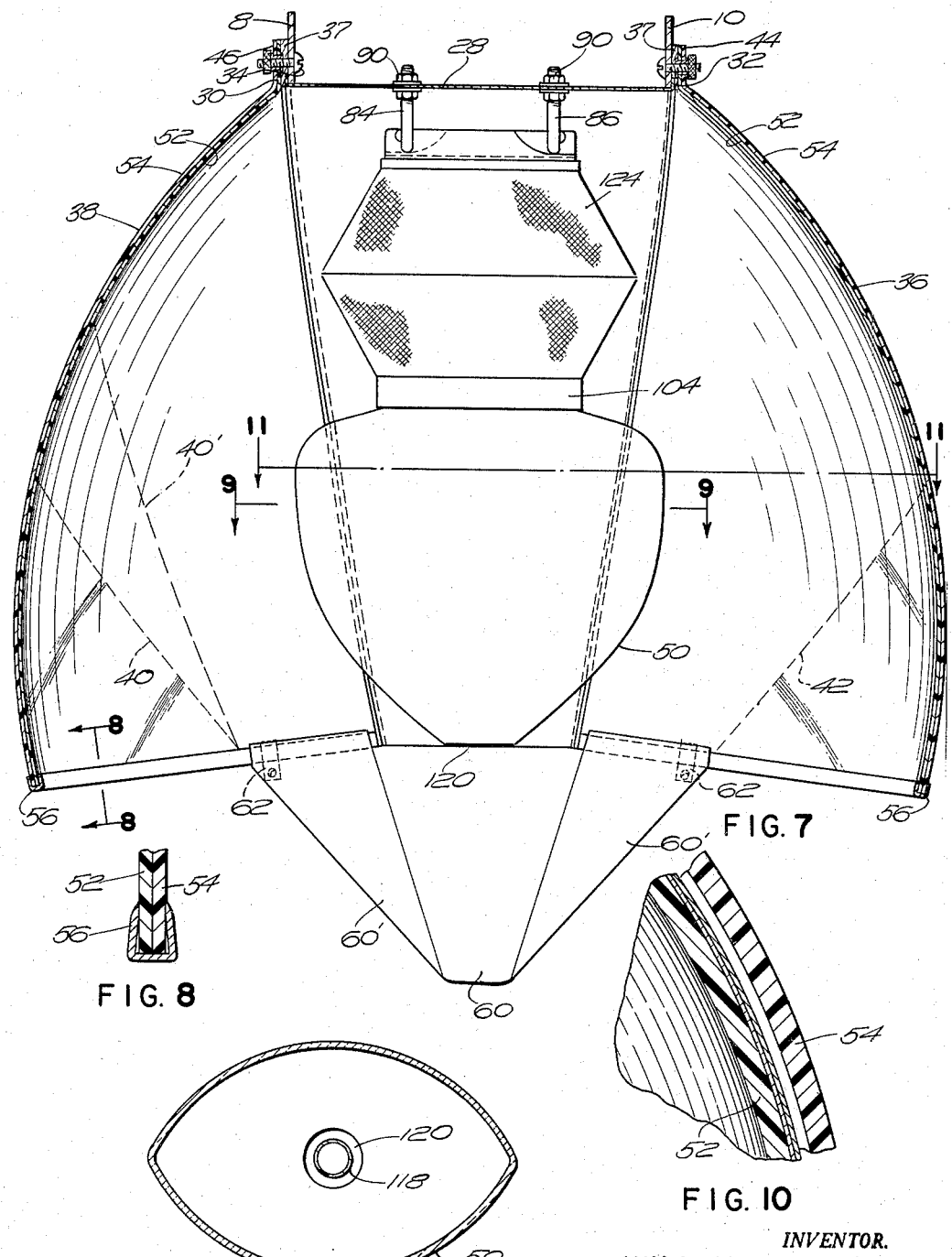

Oct. 5, 1965     W. B. ELMER     3,210,536
LUMINAIRE AND MEANS FOR LIGHTING STREETS
Original Filed March 5, 1957     6 Sheets-Sheet 4

INVENTOR.
WILLIAM B. ELMER
BY
*Porter, Chittick & Russell*
ATTORNEYS

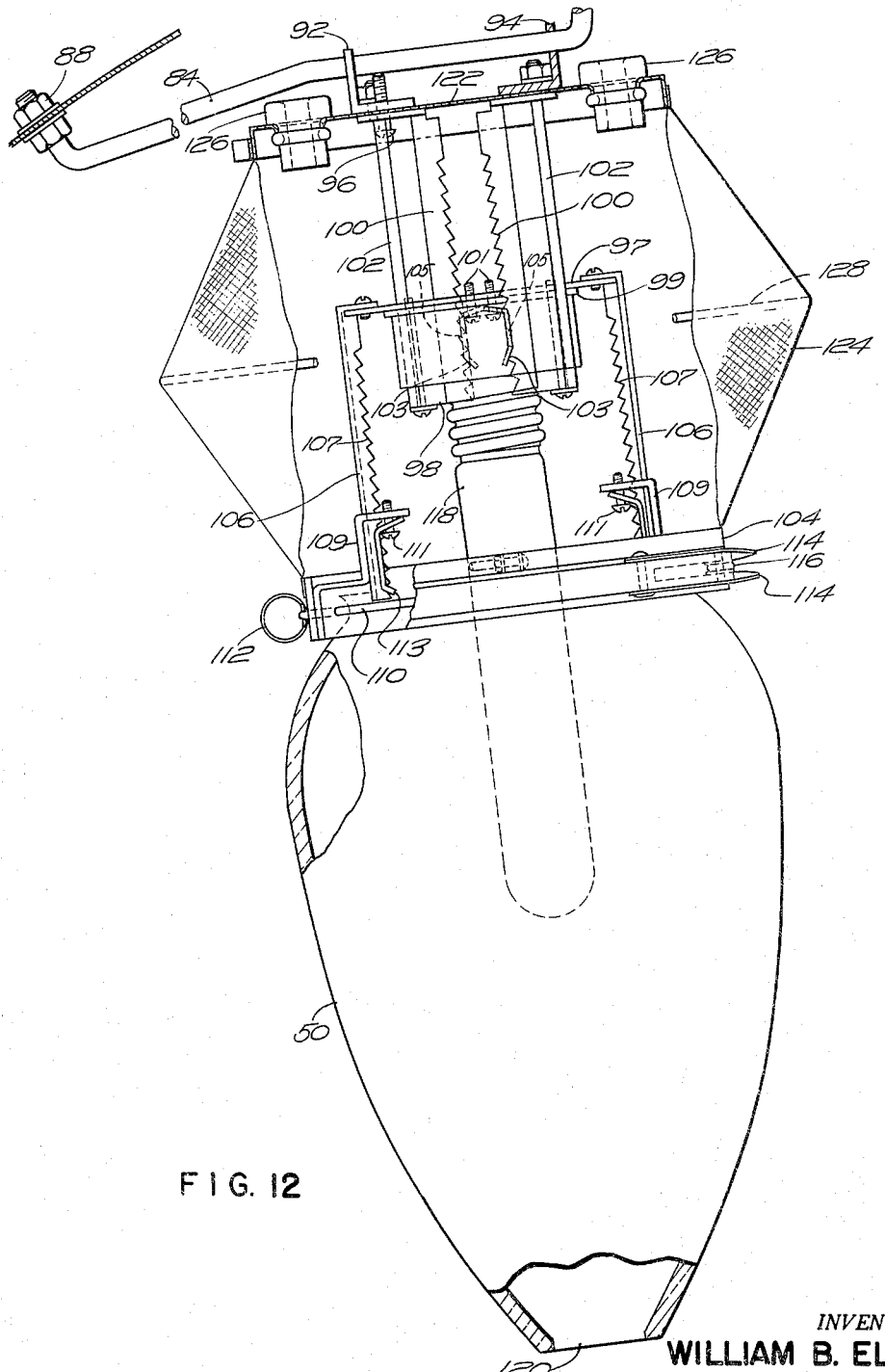

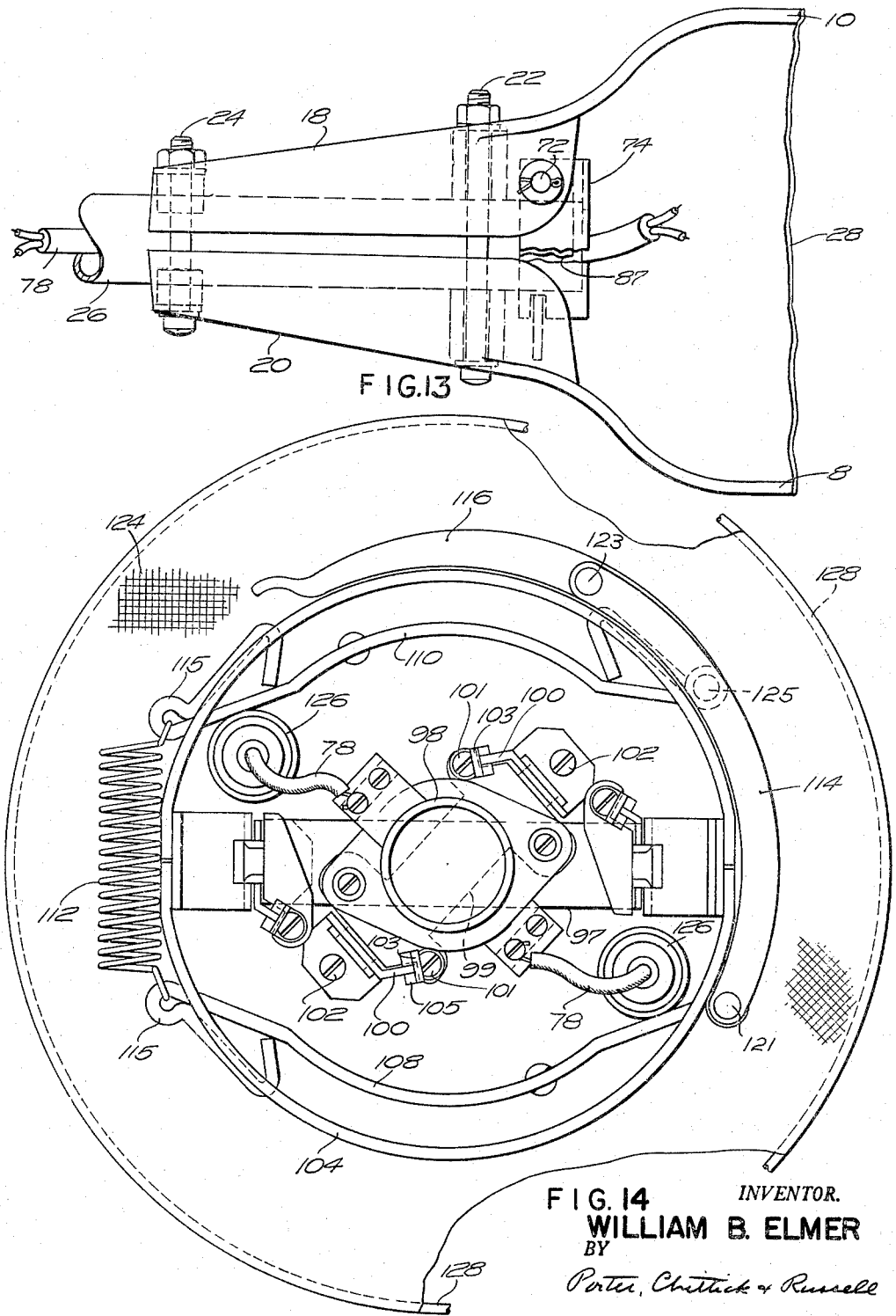

3,210,536
LUMINAIRE AND MEANS FOR LIGHTING STREETS
William B. Elmer, Boston, Mass.
Continuation of application Ser. No. 644,029, Mar. 5, 1957. This application May 28, 1962, Ser. No. 200,016
7 Claims. (Cl. 240—25)

This application is a continuation of my application, Serial No. 644,029, filed March 5, 1957, now abandoned.

This invention relates to the art of lighting and is particularly concerned with that type of lighting equipment used for illuminating streets and roadways or other large surface areas. The invention is also concerned with a method of lighting streets in which the luminaires of the present invention may be utilized to carry out lighting procedures which give novel and beneficial results.

The principal objects of this invention are (1) to produce a new and improved street light and (2) to produce new and novel methods of lighting streets. Street lights of most conventional types are glaring and the bright light seen against the black night sky may partially blind the observer or at least subject him to occular discomfort. Both of these effects tend to reduce the utility of the light. More recently some lights have been installed which utilize tubular fluorescent lamps. These long low-brightness sources of light eliminate much of the strong glare associated with the earlier conventional types of street light, but they are not efficient unless used on extremely wide streets or on streets lined with large buildings because the reflecting systems commonly built into such low-brightness fluorescent luminaires are not capable of controlling the lateral spread of light and confining it to the roadway surfaces.

Accordingly, a further object of the present invention is to provide a large area low-brightness luminaire which is capable of using conventional incandescent, gaseous discharge or fluorescent mercury lamps without causing excessive and glaring brightness and having at the same time the same excellent optical control of light distribution typical of conventional smaller high-brightness luminaires. By means of the construction disclosed herein, maximum brightnesses have been reduced from 300 to 400 candle power per square inch to the range of 15 to 25 candle power per square inch, thus greatly reducing the blinding effect while still providing the same total illumination to the street. The low-brightness of the luminous area of the light of the present construction is very uniform, far more so than in any previous street type luminaire. Brightness variations over the entire luminous area have been reduced from 30 or 40 to 1, which is common with the reflector-refractor luminaires, to 1.5 to 1 with the new diffuser-reflector luminaire of the present construction.

A further object of my invention is to provide a luminaire having a relatively large reflecting area so that the apparent brightness of each square inch of reflecting area will be low and hence easy on the eyes. It is not practical in the case of luminaires of conventional design to increase their dimensions in an effort to reduce the candle power per square inch because the cost increases in an increasing ratio with size. Optical systems in conventional luminaires consist essentially of a domed reflector with or without supplementary internal reflectors and a glass enclosing globe over the lower reflector opening. The lamp is enclosed within the reflector globe combination, and the contours of the reflector, plus supplementary internal reflecting components, plus refracting designs molded into the surface of the glass globe, are capable of re-directing the light from the lamp in carefully specified light distribution patterns. Such patterns may be made suitable for illumination of the elongated street surface with a minimum of spill light beyond the street and low loss by absorption. The glass enclosure of conventional luminaires is molded in expensive molds and the cost of these glass pieces becomes prohibitive when they are increased substantially in size in order to obtain reduced brightness per unit area. The present invention overcomes these deficiencies.

A further object of this invention is to provide a luminaire which will provide ample light at high angles with good horizontal cut-off and uniform illumination laterally across the roadway width.

Another object of the invention is to provide a construction capable of utilizing a mercury lamp mounted in vertical position. In this position such lamp will give a greater light output and have longer life and better lumen maintenance.

Still another object of the invention is the provision of a luminaire construction which is capable of burning various types of lamps, such as mercury, plain or color-improved, incandescent or sodium, without impairment of light distribution characteristics.

Another object of the invention is the provision of a luminaire so constructed that the light distribution patterns can be altered simply by choice of a diffusing globe of proper size and configuration and by adjustment of the lamp and globe position and luminaire tilt. The globes used with the present invention are far less expensive than the refracting glassware of current systems.

A further object of the invention is the provision of a luminaire which does not require any prismatic or refracting system but which, on the other hand, is entirely smooth on both its interior and exterior, thereby providing easy to clean surfaces. The appearance of the construction in the daytime is more pleasing, more compact and more conventional than that of any other low-brightness street luminaire. Additionally, the construction is such that in spite of the relatively large size, it is comparatively light. Ruggedness is obtained by the use of relatively thick plastic reflector panels with the heavy glass diffusing globe well protected within the optical enclosure.

The second main object of my invention concerns the arrangement of lights on a street in such manner that a majority of the light from each overhead lamp or luminaire is directed toward the oncoming motorist. I have found that better illumination is obtained by causing more light to be reflected from the street surface to the eyes of the driver. Thus by tilting the luminaires toward the driver or by changing the position of the lower edges of the reflectors, my method may be carried out satisfactorily. Glare is largely eliminated by the use of the large diffusing and reflecting device which greatly reduces the apparent light intensity per unit area.

It will be appreciated that in connection with the second main object of my invention, by tilting the luminaire more and more toward the driver, the direction of the beam toward the driver will become increasingly horizontal while the other beam aimed away from the driver moves more and more toward the vertical. This will be true regardless of the height of the luminaire above the ground, and in that regard it will be understood that the luminaire may, if desired, be mounted at the side or center of the roadway below the level of the driver's eyes with all of the light directed toward oncoming traffic. In all cases, the light will be aimed in a descending path to be reflected to the driver's eyes. If the luminaire is so arranged by tilting that the beam aimed away from the driver has been shifted to vertical position, then there will be substantially no light aimed in the direction in which traffic is moving.

Thus by tilting the luminaire or changing the position of the lower edges of the reflectors, the light disposed on the roadway may be varied from equal in both directions to a maximum toward the driver and none in the direction of traffic.

These and other objects of the invention will become more clearly apparent as the description proceeds with the aid of the accompanying drawings in which:

FIG. 4 is a side elevation of the luminaire with those parts of the diffusing globe and electrical connections that are hidden by the reflecting surface shown in dotted lines;

FIG. 5 is a section on the line 5—5 of FIG. 4;

FIG. 6 is a section on the line 6—6 of FIG. 4;

FIG. 7 is a vertical section taken on the line 7—7 of FIG. 4;

FIG. 8 is a section on the line 8—8 of FIG. 7;

FIG. 9 is a section on the line 9—9 of FIG. 7;

FIG. 10 is an enlarged and partially exploded view of a short section of the reflector with the inner and outer layers separated for purposes of explanation and understanding of the construction;

FIG. 12 is an enlarged view of the lamp and diffusing globe and the supporting structure therefor;

FIG. 13 is a plan view of the slip fitter connection by which the luminaire is supported; and FIG. 14 is an enlarged view looking upwardly at the globe supporting ring and the lamp supporting and electrical elements.

Figure 1:
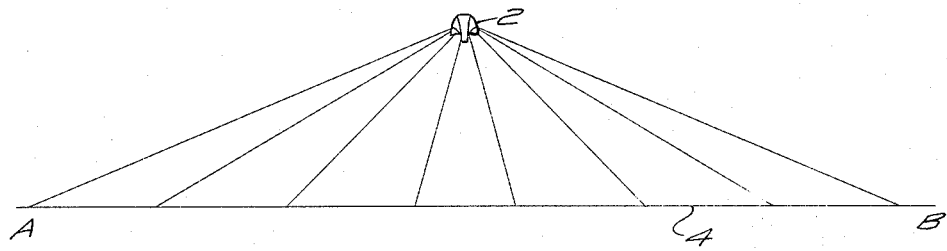
FIGS. 1 and 2 are schematic showings of the luminaire positioned over a street showing the general pattern of the light distribution.
Figure 2:
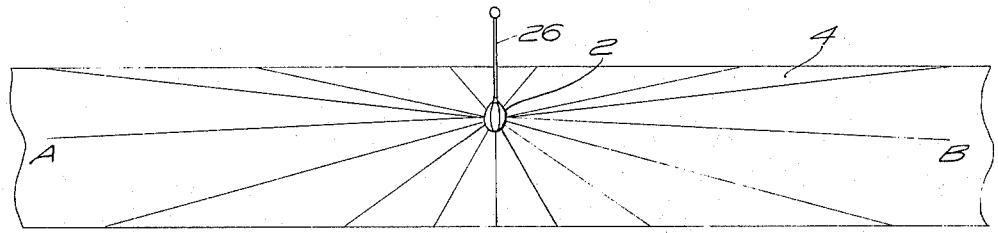

Referring to FIGS. 1 and 2, which are for the purpose of giving reference to the invention, the luminaire is generally indicated at 2 positioned over a street 4 and the light distribution system is such that the light, both direct and reflected, is spread over a long longitudinal area from A to B and over the full width of the street, making a substantially uniform distribution pattern. Studies have been made showing the candle power distribution over the lighted area. These tests have shown that at a test distance of 40 feet the candle power at different angles from the lamp varies as follows: directly under the lamp, 1600; at 20° from the vertical, 1700; at 40°, 2300; at 50°, 3700; at 60°, 6400; at 67°, a maximum of 7100; at 70°, 6900; at 80°, 4000. These results clearly indicate the ability of the luminaire to give a very uniform light effect over a long street distance. If for example, the light were mounted 40 feet above the street, the foot candles of illumination immediately therebelow would be approximately 1.0. At 20° from the vertical, it would be .92; at 40° from the vertical, it would be .87; at 50°, .93; at 60°, 1.0; and finally at 67°, .68. In other words, because of the improved optical system substantial uniformity of illumination is obtained over a long longitudinal distance while being controlled in width, and this is true regardless of the height at which the lamp is positioned. In the case just cited, the uniform illumination would extend for approximately a distance of 180 feet, 90 feet each side of the luminaire. If the height of the lamp were 20 feet, the foot candles of illumination at the various angles given above would be four times as great, but the longitudinal distances would likewise be halved to 90 feet. The illumination extends with decreasing effectiveness beyond the 67° angle set forth above, with cutoff coming at approximately 80° from the vertical. It is to be understood, however, that the above figures are not fixed and may be varied and controlled by using lamps of greater or less candle power and by shifting the position of the lamp with respect to the reflector, all as will be explained hereinafter.

With respect to the lateral distribution of light, the construction is such that the light is confined so as not to be wasted on the adjacent land or buildings. This is accomplished by the combination of the diffusing globe and the novel shaped reflector and the setting of the unit, which may be adjusted, as has been stated, according to the requirement to be met.

Figure 3:
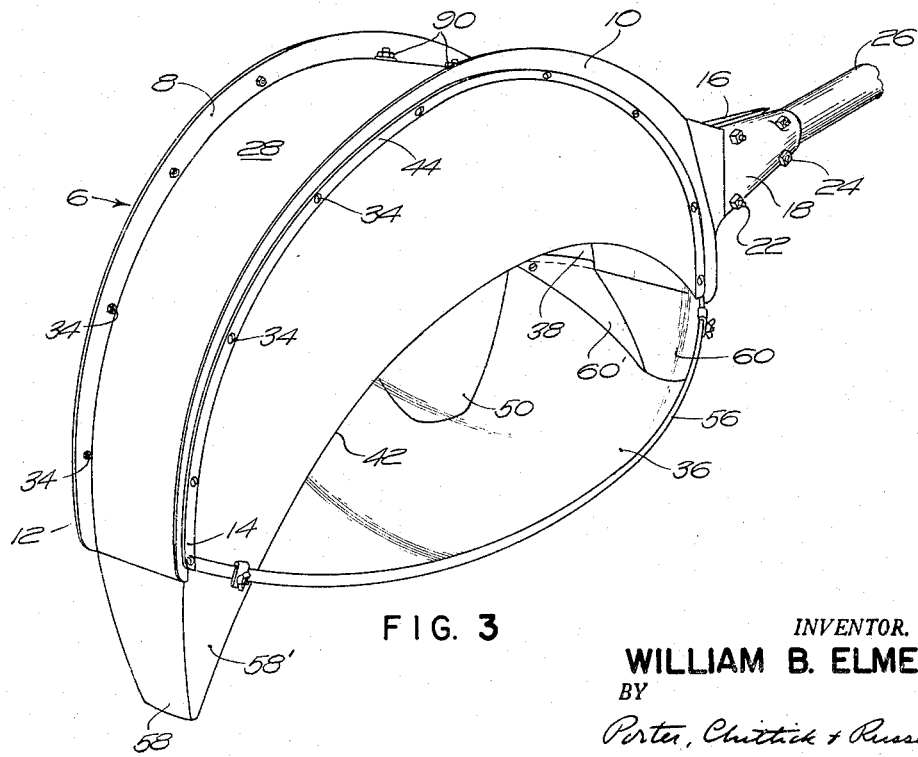
FIG. 3 is a perspective view of the luminaire.

In my luminaire, I use a reflecting system and a diffusing globe mounted within said system, and a lamp in turn is mounted within the diffusing globe. In order to achieve light weight to keep to a minimum the support strength requirement for the lights which are attached to a street light arm or pole, an arch-shaped body 6 (see FIGS. 3 and 4) is constructed with two curved ribs 8 and 10 which comprise the main structural elements of the luminaire. These ribs are roughly sickle-shaped and roughly parallel, but from the end view of the luminaire, as can be seen in FIG. 3, it will be observed that they are slightly out of parallel, with the top portions separated more than the lower tip ends 12 and 14. The "handle" end of the sickle is extended horizontally as at 16 in the form of two clamping plates 18 and 20 (FIG. 5) in pipe gripping relationship and provided with means in the form of bolts 22 and 24 for clamping laterally to a pipe 26 which acts as a supporting arm.

A degree of flexibility and ductility is provided in the material of these supports to permit the handle or support end 16 to spring or bend horizontally when clamped on the pipe. In other words, the two clamping plates 18 and 20 can bend slightly in a horizontal direction without rupturing or damaging the structure.

The space between the two main arch supports 8 and 10 is occupied by an arch of thin aluminum sheet cut to fit as at 28. This arch sheet is provided with upstanding narrow flanges 30 and 32 on the two long sides, which flanges extend under and upwardly on the outer surfaces of the two arches (see FIG. 7). This construction provides for natural drainage down the exterior surface of the sheet 28. A series of studs 34 is set in each of the two ribs, and these studs extend laterally to receive the reflector.

The reflectors for the luminaire are formed as follows: The reflector material is initially formed into a dome shape and then cut in half to provide two halves 36 and 38. Each of these reflectors thus produced is substantially symmetrical about its central axis both horizontally and vertically. In one embodiment the dome is formed by pneumatic or vacuum pressure applied to a hot transparent thermo-plastic sheet until the desired dome contour is obtained. A mold may be used, if desired. The dome cross-section can be chosen as circular or parabolic or any desired modification therebetween. After the dome is formed, it is cut into two equal halves through the central axis, thus forming the two reflector elements 36 and 38. A mirror finish is applied to a portion of the reflector area. As shown in the drawings, this is the area above the line 40 in FIG. 4, 42 in FIG. 3, and the lines 40 and 42 of FIG. 7. Each of the halves is provided with an outwardly turned flange as at 44 and 46 and holes through these flanges match corresponding studs 34 in the ribs 8 and 10 so that the halves 36 and 38 can be securely affixed to the ribs by the studs 34.

Figure 11:
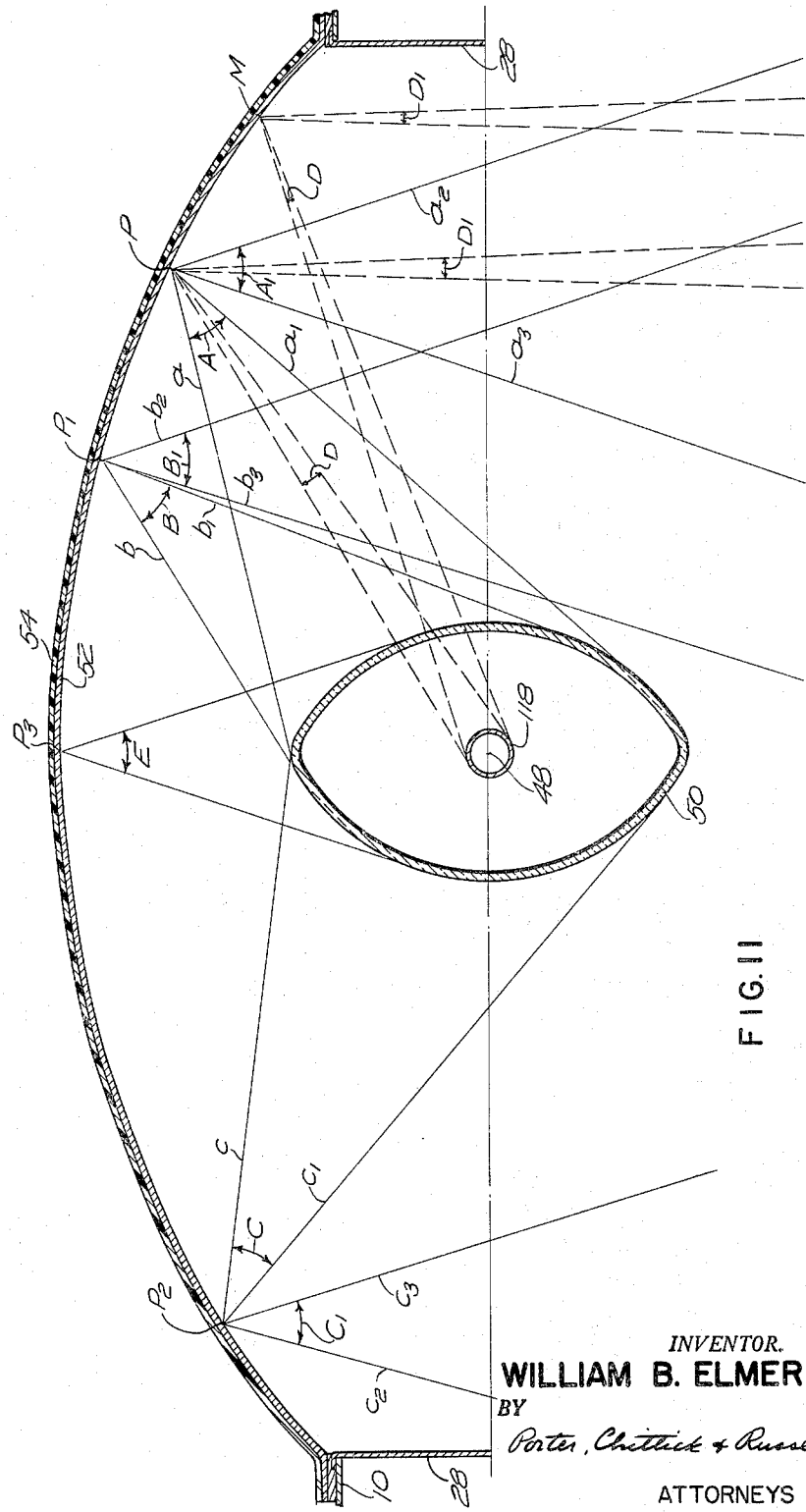
FIG. 11 is a horizontal section on the line 11—11 of FIG. 7 showing the nature of the reflecting system.

In order to obtain the desired light distribution pattern that is characteristic of my invention, I have found it advisable to stretch the half domes in the direction of their longest dimension and the arcuate metal body consisting of the ribs 8 and 10, and the arch sheet 28 is so constructed as to receive the reflectors 36 and 38 in the stretched or elongated position and to retain them in this condition. This elongation of the reflectors 36 and 38 is so arranged that the cross-section in the horizontal plane, as shown in FIG. 11, is in the main generally parabolic with the focus of the parabola approximately at the center of the luminaire, which point is indicated at 48 in FIG. 11. The vertical cross-section, shown in FIG. 7, is also roughly parabolic, but the focus of the vertical contour is much shorter than that of the horizontal section and does not coincide with the center of the luminaire. The net result of this optical arrangement is to produce a relatively vertical fan-shaped distribution of light which is narrow horizontally and broad vertically, as shown schematically in FIG. 1 and in more detail in FIG. 11. This span of light is so proportioned as to cover effectively the pavement area of the street beneath the light and in both longitudinal directions away therefrom. The disposition of the reflectors 36 and 38 with respect to the globe 50 is such that the main concentration of light is directed toward the center of the street generally at an angle between 60° and 80° to both sides of the vertical.

The interior under surface of the body arch 28 is finished in white enamel, either ceramic or baked, and this white surface produces a generally diffusing downward light on the street in the immediate adjacent area. By this mechanical system, I am able to achieve the desired optical effects inexpensively and simply despite the relatively large size of the parts. In one embodiment of my invention, the hood is in the order of 4 feet from end to end and about 3 feet in width as contrasted to 13 to 30 inches for the earlier reflector-refractor types of luminaire.

As can be seen in greater detail in FIG. 10, the reflector proper comprises two conforming layers of transparent thermo-plastic material, the inner layer being numbered 52 and the outer layer 54. These layers are shown separated in FIG. 10 so as to disclose the mirror construction more particularly. To the outer surface of plastic layer 52 and above the lines 40 and 42 is applied a thin layer of aluminum by the well known process of molecular deposition under vacuum, the aluminum acting as the reflecting material. A coat of paint or other suitable coating material is then applied to the aluminum to secure it and to protect it. Then the outer plastic half dome layer 54 is brought into overlying engagement with the inner layer to give permanent protection to the reflecting surface.

It will be understood that those portions of the two plastic layers below the lines 40 and 42, as shown in FIGS. 3, 4 and 7, are perfectly clear and do not carry any reflecting material or paint. The lower edges of the layers or sheets 52 and 54 are held together by U-shaped ferrules 56 which extend along the entire lower edges of both of the reflectors, thereby to prevent their separation and to improve the rigidity and security of the device. The ferrules may be crimped and cemented in place, thus preventing the entry of water between the lower edges. Similarly, the upper flanges 44 and 46 may be cemented prior to being secured by the studs 34 previously referred to. I prefer the construction in which the two layers of plastic are completely cemented throughout their common perimeter so that no breathing can take place in the interstice containing the mirror layer. Ample oversize holes for the attaching studs are drilled through the cemented area and do not permit breathing. Metal grommets are flanged into each hole to protect the plastic during installation over the threaded studs 34.

The nuts 35 are recessed underneath to clear the grommet flanges and are knurled for finger tightening to avoid excessive tightening force on the plastic. The gasket 37 is soft and spongy and provides ample cushioning for the plastic flange against the body arch.

The mirrored reflecting area of the two reflectors 36 and 38 is generally crescent-shaped and the two reflectors can be identical or dissimilar. For general applications where one row of street lights is installed on one side of the street only, the two reflectors are identical. To carry out the method of my invention involving directing a majority of the light toward oncoming traffic, the lights are installed in a row along the street and preferably spaced uniformly, but it will be appreciated that the method can be performed by a single light or by lights irregularly spaced. When the lights are installed on one-way streets or on two-way traffic streets illuminated by lights on both sides of the street, the reflectors are preferably dissimilar, the mirrored area being less on the side of approaching traffic so that more light is directed toward oncoming traffic. For example, if traffic were approaching the lamp shown in FIG. 4 from the viewer's side, the mirrored surface on this side might terminate at the dotted line 40', whereas the mirrored surface on the other half of the reflector would terminate at a line 42 corresponding to line 40 in FIG. 7.

In the dissimilar arrangement, the globe and lamp assembly are preferably dropped slightly with respect to the arch to raise the reflected beams of light, and the result is a substantial increase of light in one direction and a corresponding decrease in the other. I have found that the directional luminaire disclosed herein greatly increases distant illumination and visibility in one direction of the roadway and decreases it in the other. For one-way streets or divided highways, the directional luminaires fitted with lamps of one-half to two-thirds normal light output provide visibility for motor vehicle drivers equal to that provided with full output lamps in symmetrical or standard luminaires, thus giving very substantial economy in the lighting of such streets.

While the method of my invention may be effectively carried out through the use of the luminaires disclosed herein and in the manner explained above, it is to be understood that the method could also be performed through the use of lighting fixtures of other constructions provided such other fixtures are capable of directing the light in the required directions while at the same time avoiding a blinding effect on the driver of the vehicle.

Visors 58 and 60 are attached to the two lower ends of the body arch to provide shielding of adjacent buildings from direct light from the luminaire and to provide a graceful and symmetrical over-all appearance. Each of the vistors includes two side wings which have been numbered 58' and 60'. These are so shaped that their upper edges will fit within the confines of the ferrules 56. Each of the wings is held against the corresponding interior vertical surface of the ferrules 56 by means of a clip shown in FIG. 6. This clip comprises a U-shaped element 62 having a short horizontally turned upper end 64 and a longer lower horizontal end 66. End 64 hooks over the upper edge of ferrule 56 and end 66 rests against the outer surface of wing 58'. A bolt 68 with a wing nut 70 threaded thereon acts to hold the clip in tight engagement, thereby effectively securing the visors in place.

The support end 16 of the luminaire is provided with a combination stop and leveling adjustment best shown in FIGS. 4, 5 and 13. A vertical threaded bolt 72 is rotatably mounted off center on one side of the supporting extension. The bolt extends from upper shelf 69 to lower shelf 71, being maintained in position by cotter pin 73 and head 75. The bolt also passes through the horizontal flanges of a U-shaped stop 74. The horizontal flanges are adapted to receive therebetween the end 77 of the pipe support 26 (see FIG. 4). Bolt 72 is in threaded engagement with a plate 82 secured by welding or otherwise to the under side of the upper horizontal flange of the stop. By loosening bolts 22 and 24 and rotating bolt 72 which is, as stated, in threaded engagement with plate 82, the angular position of the luminaire with respect to the end of support 26 may be varied at will. When the correct position has been determined by reference to any suitable tilt indicia, the bolts 22 and 24 may be tightened to hold the unit securely in the selected position.

A hole 76 in the central vertical area of the stop permits wires 78 within pipe support 26 to extend through the stop and continue into the luminaire by way of a cable entrance connector 80 in the metal body of the luminaire.

The inner surface of the body arch carries two rods 84 and 86 extending generally parallel to the long dimension of the body. These rods are affixed to the body at both ends by suitable nuts 88 and 90 threaded thereon, as can be seen in FIGS. 4, 7 and 12. These rods in turn support the lamp socket and globe assembly, as best shown in FIG. 10. The attaching means comprises angles 92 and 94 detachably and slidably secured to the rods. A set screw 96 may be forced against the under side of one or both of the rods to hold the lamp socket and globe assembly in any selected longitudinal position.

The rods are horizontal in the central region of the hood but tilt at an angle of 10° in the region toward the slip fitter end. In order to throw the reflected light pattern away from the curb and toward the center of the street for those conditions in which the luminaire is installed on a short support arm close over one side of the street, the lamp structure may be moved to the left along rods 84 and 86. This not only changes its position within the hood but also changes the vertical angle of the lamp and globe.

Referring to FIGS. 12 and 14, the lamp socket, lamp and globe are mounted in the following manner: A circular plate 122 is carried by the angles 92 and 94 and has therethrough porcelain bushings 126 to receive the electric wiring. Depending from plate 122 are two guide straps 102 and two ribs 100 notched on one edge. A rectangular plate 97 extends crosswise between rods 102 and ribs 100, and to the under side of plate 97 is secured another shorter plate 99 which carries the socket 98 and in which are screws 101 which act to force the ends 103 of the slotted pawls 105 in the selected notches of ribs 100. From the foregoing, it will be understood that plate 97, carrying socket 98, may be adjusted vertically with respect to plate 122.

Extending downwardly from the ends of plate 97 are two other ribs 106 notched at 107 on which are vertically slidable the angles 109 which carry the globe ring 104. The globe ring may be adjusted vertically with respect to ribs 106 by loosening screws 11 to free pawls 113 from notches 107, moving the ring 104 to the proper position and then tightening screws 111.

Thus it will be seen that the lamp 118 carried by socket 98 and the globe 50 carried by globe ring 104 may be adjusted vertically as a unit by the use of the toothed ribs 100. On the other hand, the globe ring 104 and globe 50 may be adjusted vertically independently of lamp 118 through the use of the toothed ribs 106.

The globe ring 104 is provided with a globe clamping mechanism (see FIGS. 12 and 14) comprising two heavy flexible arcuate wires 108 and 110 with lops 115 on both ends extending out through slots in the globe ring. The loops 115 are held in position with respect to the globe ring by a tension spring 112 on one pair of ends and by a pair of links 114 and a handle 116 straddled by the links joining the other pair of ends. The handle and links form an over-center linkage, as can be seen in FIG. 14. The links 114 are pivoted to wire 108 at 121 and pivoted to handle 116 at 123, while the handle 116 is pivoted to wire 110 at 125. When the handle is open, the arcuate globe support wires are separated by the tension spring, permitting easy removal of the globe 50. When the globe is placed in its proper location and the handle 116 thrown to the locking position of FIG. 14, the grooved glove neck is firmly gripped with distributed pressure and locked in place secure against jarring free or tipping out of position.

The wiring of the lamp socket is conventional and it is believed no detailed description need be given. The entire lamp, socket and globe assembly is horizontally adjustable along rods 84 and 86, as already described, and this adjustment, combined with the vertical adjustment provided and above referred to, makes it possible to accommodate a variety of lamp sizes, including lamps of varying lengths, thereby to control the direction in which the main reflected beams of the laminaire are projected with respect to the street in both the horizontal and vertical senses. Thus the luminaire is capable of exact application to the particular geometry of the street to be lighted in accordance with height, off-set from street center and street curvature or slope.

The globes, of which only one form is shown herein, are preferably supplied in several sizes, whereby by proper selection of globe size as determined by the width of the street to be illuminated, proper lighting results are obtained. The globes are preferably constructed with oval cross-section in the horizontal plane, as is illustrated in FIGS. 9 and 11. Such globes, acting in combination with the reflector, produce as nearly uniform illumination of the street width as possible. The manner by which this is accomplished is shown by reference to FIG. 11. The long globe axis is mounted at right angles to the long axis of the luminaire. The globe is of a diffusing translucent material and generally, although not necessarily, is of glass, such as "opal" or heavy "alabaster" glass, or even of clear glass with a thin white ceramic coating or glass layer on one or both sides to provide light diffusion. Optionally, in place of the lamp 118 of relatively small dimension and the diffusing globe 50, I may use a lamp having a much larger than normal bulb provided the bulb can approximate the dimensions of the globe to give the necessary area of diffused light that is transmitted to the reflector.

In order to adapt my optical system to various street widths, I select a globe of such dimensions that when the light emitted therefrom is reflected from the reflecting surface, the spread of the light may be controlled exactly as desired. Again referring to FIG. 11, lamp 118 is in the center surrounded by diffusing globe 50 of selected dimensions. By virtue of the light diffusing character of the globe, such globe, when illuminated from within by the lamp, becomes luminescent and serves in effect as a primary light source with respect to the reflector.

The luminescent globe throws an angle of light A included between lines $a$ and $a'$ which strikes at any point P of the parabolic reflector. This light is reflected at a similar angle A1 and because of the width of this angle it can be seen that the light will be spread laterally toward both sides of the roadway and within the confines of lines $a2$ and $a3$. Several points P, P1 and P2 are shown to illustrate the manner in which light coming from the globe to various parts of the reflector over the relatively wide angles B and C is reflected over the angles B1 and C1 to give a light that is spread and diffused.

By contrast with this type of diffused light produced through the use of the diffusing globe 50, let it be imagined that the globe is removed and instead there is now the uncovered small concentrated mercury light 118. This light will send a strong narrow ray to any point M over a very narrow angle D which will be reflected back over a corresponding narrow angle D1. A similar narrow beam is shown reflected from point P. Because of the parabolic nature of the mirror, all of the reflected rays of the lamp 118 will be substantially parallel and will not give the spread necessary to produce the desired width of illumination and it will be of an unsuitable nature from a glare standpoint.

In other words, when my globe 50 is introduced into the luminaire enclosing the lamp 118, the globe by its diffusing nature becomes generally luminous with a relatively high degree of uniformity over its entire surface area and the globe so illuminated then becomes in effect a larger and more distributed light source within the luminaire. The light received at all points on the reflector and as illustrated by the several points P, P1 and P2 arrives from all portions of the globe subtended by the angles A, B and C and the reflection from the points P, P1 and P2 is correspondingly broadened into distributed reflected beams of light A1, B1 and C1.

It is apparent that I may substitute for the globe 50 other globes of different sizes and on so doing the angles of incident light striking the points P, P1 and P2 will be correspondingly different, larger or smaller, as the size of the globe is increased or decreased and these rays will be correspondingly reflected with different angles of divergence.

It is thus seen that I have accomplished a widening or narrowing of the over-all beam of light projected from my luminaire simply by altering the size of the small internal enclosing globe 50 and that it has now been made unnecessary to provide a plurality of large prismatic enclosures for the entire luminaire in order to alter the light distribution. In the present invention, it is necessary not only to widen the pencils of light projected from my luminaire but also to direct these pencils so that they are registered and coincident with the street surface. As the globes are interchanged to obtain the desired width of beam spread, I may also shift the light source within the luminaire so that the over-all direction of the projected beam is adjusted to the street location.

In my preferred embodiment, I have provided means for shifting the lamp and globe assembly longitudinally within the luminaire, although I sometimes prefer to pivot the assembly for the same purpose. I have also provided vertical adjustment of the lamp and globe assembly together or the globe by itself to adjust its height with respect to the reflecting surface. I have further provided an optional leveling adjustment, which has already been described with respect to FIGS. 5 and 13, whereby the entire luminaire may be tilted upward somewhat as may be necessary to project the light to the desired areas.

Thus it is believed obvious that by proper positioning of the internal lamp and globe assembly with respect to the reflecting surfaces and by adjusting the angle of the entire unit, the beam direction of the light can be controlled as desired with each optional globe size that may be used in such manner as to place the projected light upon the street surface with the desired distribution. By the use of the present construction, it is possible to obtain the best light distribution from the system when the lamp and the enclosing globe are in a vertical or near vertical position. In such position the lamp operates most efficiently and does not, if of the mercury type, require supplemental electrical auxiliary equipment, such as electro-magnets, which are sometimes necessary to enable it to operate in a horizontal position.

Reference has been made to the various alternative globe configurations that may be used, but I have determined that I obtain a superior light distribution by using an oval globe such as is shown in the drawings.

Again referring to FIG. 11, in which is shown a horizontal plan view of the reflector with the oval globe in use, it will be noted that the oval is disposed at right angles to the long axis of the reflecting system. On referring to the several ray diagrams in this figure, it will further be noted that the oval shape of the globe is such that the angle with the apex at the reflector surface and subtended by the width of the globe is substantially constant across the entire width of the parabolic reflector. That is to say, the angles A, B and C are substantially equal, and this is caused by the fact that the apparent width of the globe decreases as the center point of the reflector is approached. The minimum position is shown at P3, at which the angle of the rays from the lamp is indicated at E. In each case the included angle of the rays impinging on the reflector at all points over its surface is substantially equal. For this reason the oval-shaped globe is the preferred form. If a circular globe were used, the angle of the reflected pencil from the ends of the reflector would be smaller than those reflected from the central region of the reflector. Accordingly, by using the oval globe construction in which the globe cross-section is correctly related to the generally parabolic configuration of the reflector, I maintain a uniform illumination across the width of the roadway with the illumination dropping off sharply and abruptly at the edges of the roadway, thereby insuring a maximum utilization of the generated light on the roadway surface.

In the preferred form of construction, I leave the lower portion of the luminaire open, and it would, therefore, be possible for insects to contact the inner portion of the globe 50 were provision not made to the contrary. Such insects might fill the globe in time and obscure or even destroy the lamp. On the other hand, the lamp must not be sealed in, as ventilation is desirable. I, therefore, have provided the following construction: Each globe is provided with ventilation means in order to avoid failure due to excessive temperatures resulting from the use of large lamps in relatively small enclosures. Ventilation is accomplished by a hole 120 at the bottom of globe 50, and the lower portion of the globe is funnel-shaped to permit any small insect bodies which may enter the globe to become desiccated by the heat of the lamp and to drop out through the hole. The angle of the funnel-shaped wall is steep enough to assure gravity discharge of the insect bodies. The upper plate 122, already referred to, serves as an upper closure, and the space between this plate and the globe ring 104 is occupied by a cylinder of flexible screening 124 optionally extended circumferentially in its mid-section by a ring 128. This screening excludes the entrance of any but the smallest insects into the top of the globe. The flexible screening is preferably arranged with a bias weave so that it automatically extends of collapses as the globe ring socket is raised or lowered. I prefer to use an insulating screening material, such as fiber glass, preferably coated with white plastic material to avoid possibility of accidental short circuits by contact with the socket terminals but still open enough to provide ventilation by convection. The upper plate 122 is provided with porcelain or other suitable insulators as at 126 to permit the entrance of the electrical supply wires 26 inside the screen and globe assembly and their connection to the socket terminals.

Although the large size and open design of my luminaires results, generally speaking, in low operating temperature rises, nevertheless if very large lamps are used I may provide an optional weather-proof ventilating hood (not shown) in the top of the body to avoid excessive temperatures.

It will be noted that in the preceding description the lower central region of the reflectors, namely, that portion below the lines 40 and 42 (see FIGS. 3, 4, and 7) is clear and transparent. Although the main beams of light from the luminaire pass through these clear areas, some light is reflected from these clear areas by surface reflection, and this reflected light produces a noticeable surface brightness at these clear regions which adds to the apparent luminous area of the luminaire and thus reduces the overall net glare. When double layer plastic reflectors are used, such as have been described above and are shown in detail in FIGS. 8 and 10, these surface reflections amount to nearly one-fifth of the total light striking the clear reflector surfaces, thus providing greater brightness than that provided by single layer plastic reflectors and thereby reducing the apparent difference in brightness between the mirrored and clear areas of the reflecting sides of the luminaire. This effect makes for a very large effective working area of the optical system with resultant decrease in glare and increase in visibility.

Since the luminosity of my supplementary globe 50 provides the primary light distribution for the optical system, it can be seen that the size or area of the lamp within the globe produces little or no appreciable effect on the net light distribution characteristics of the luminaire. The lamp 118 can be of the type having either a concentrated or a diffused light source, and the source can be of substantially any size or shape as long as it is contained within the globe. The light distribution from the luminaire is not appreciably altered by such variations in lamps. The lamps can be large or small incandescent bulbs, incandescent with white wall bulbs, vapor lamps with color-correcting bulb wall coating, sodium lamps, or any other type lamp which may be introduced within the diffusing globe. Regardless of such choice of lamp, the light distribution of the luminaire is relatively unchanged.

From the foregoing explanation and description, it will be appreciated that I have eliminated the necessity for a variety of expensive transparent prismatic enclosures of the type now used with conventional optical systems and have obtained variations in light distribution by a series of relatively small and inexpensive diffusing lamp enclosures suitably positioned within the reflector. I have also provided a luminaire in which the lamps are burned in the preferred vertical position without impairment of light distribution characteristics. I have provided a luminaire in which the light distribution is substantially independent of the kind of lamp used, and further I have provided an optical system in which ventilation of the lamp enclosure is effected without accumulation of insect bodies. Additionally, I have provided an optical system having the foregoing advantages which is adjustable in mounting angle and internal lamp and globe position to achieve all the desired light distribution patterns for street and highway lighting. I have provided also an efficient luminaire construction of large sizes whereby I obtain low average reflector brightness and consequent low glare, and finally I have provided a luminaire large enough to give close control and full utilization of light from large distributed source types of lamps.

It is my intention to cover all changes and modifications of the example of the invention herein chosen for purposes of the disclosure which do not constitute departures from the spirit and scope of the invention.

I claim:

1. A traffic way lighting means comprising a series of luminaires mounted on stationary supports in an elevated relation to said traffic way, each luminaire comprising an optical system having reflector means disposed on opposite sides of a lamp for directing a principal beam, the axes of said reflector means being disposed to project said beam parallel to said roadway and slightly below the horizontal level of said luminaire, said reflector means forming said principal beam substantially stronger than the light emanating from said reflector means in directions other than said principal beam and aimed in the direction of oncoming traffic with the maximum concentration in the lane of said oncoming traffic.

2. Means for illuminating a so-called one-way street for automotive vehicles comprising means for supporting fixed spaced luminaires elevated substantially above the traffic on said street, means for simultaneously directing two beams of reflected light coming from a common light source in each luminaire in opposite and crossing directions with the maximum concentration of both beams below the horizontal direction, said means forming one of said beams to be substantially stronger than the other of said beams and directed toward oncoming traffic with the maximum concentration in the lane of oncoming traffic on said one-way street.

3. The apparatus set forth in claim 2, in which the weaker of said beams is directed at a steeper angle relative to the horizontal than the other of said beams.

4. The apparatus set forth in claim 2, in which the beams of light are reflected from reflecting areas in said luminaire which are large in relation to said light source to prevent blinding glare when observed directly by a vehicle driver.

5. Means for lighting a traffic way for motor vehicles, said means comprising a series of stationary spaced luminaires mounted in elevated relation along a roadway to provide illumination for said way, said luminaires each including an optical means for producing two generally opposite concentrated beams of light, each beam reflected from oppositely disposed reflectors affixed with respect to each other, means for mounting each said luminaire to be tilted to direct the light from one of the reflectors in the direction of oncoming traffic at a relatively flat angle, with the maximum intensity of the beam less than 90° from vertical and in the lane of said oncoming traffic and the light reflected from the other reflector being directed away from oncoming traffic at a relatively steep angle.

6. Means for lighting a traffic way for motor vehicles, said means comprising a fixed elevated support and a luminaire carried by said support substantially above the traffic on said traffic way, said luminaire including a reflector means for producing light which is directed downwardly and distributed in opposite directions both toward and away from oncoming traffic, and said reflector means proportioning the light directed toward the traffic lane carrying oncoming traffic to be substantially greater than that directed toward said lane in the opposite direction with the maximum concentration falling in said traffic lane carrying oncoming traffic and not extending into adjacent opposite-direction traffic lanes.

7. Means for lighting a traffic way for motor vehicles, said means comprising a series of luminaires on stationary supports in elevated relation to the traffic way, said luminaires each including an optical system having two unequal size reflector means disposed on opposite sides of a lamp for producing two generally opposite concentrated beams of light directed below the horizontal through said luminaires, said reflector means forming said beams with the larger reflecting means providing a beam which is substantially stronger than the other of said beams and aimed in the direction of oncoming traffic with the maximum concentration in the lane of said oncoming traffic.

References Cited by the Examiner

UNITED STATES PATENTS

| 1,814,669 | 7/31 | Cushing | 240—8.22 |
| 2,647,202 | 7/53 | Elmer | 240—25 |
| 2,800,576 | 7/57 | Epperson | 240—25 |

FOREIGN PATENTS

| 862,624 | 12/39 | France. |
| 876,085 | 7/49 | Germany. |

NORTON ANSHER, *Primary Examiner.*

EVON C. BLUNK, *Examiner.*